(12) United States Patent
Boyd et al.

(10) Patent No.: US 6,313,248 B1
(45) Date of Patent: *Nov. 6, 2001

(54) THERMOSETTING POLYMERS WITH IMPROVED THERMAL AND OXIDATIVE STABILITY FOR COMPOSITE AND ADHESIVE APPLICATIONS

(75) Inventors: Jack Douglas Boyd, San Clemente; Albert Kuo, Cypress, both of CA (US)

(73) Assignee: Cytec Technology Corp., Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/748,438

(22) Filed: Nov. 13, 1996

Related U.S. Application Data

(60) Provisional application No. 60/006,452, filed on Nov. 13, 1995.

(51) Int. Cl.$^7$ .................................................. C08F 122/40
(52) U.S. Cl. .......................... 526/262; 526/333; 526/334; 528/322
(58) Field of Search .................................... 526/262, 333, 526/334; 528/322

(56) References Cited

U.S. PATENT DOCUMENTS

| | | | |
|---|---|---|---|
| 3,536,734 | 10/1970 | Vegter et al. | 260/348.6 |
| 4,035,345 | 7/1977 | Ducloux et al. | 260/78 UA |
| 4,100,140 | 7/1978 | Zahir et al. | 526/90 |
| 4,175,175 | 11/1979 | Johnson et al. | 528/125 |
| 4,546,131 | 10/1985 | Hefner, Jr. | 523/466 |
| 4,654,407 | 3/1987 | Domeier | 526/262 |
| 4,689,378 | 8/1987 | Chaudhari et al. | 526/259 |
| 4,789,704 | 12/1988 | Stenzenberger | 524/548 |
| 4,871,821 | 10/1989 | Stenzenberger | 428/411 |
| 4,917,954 | 4/1990 | Stenzenberger | 526/262 |
| 4,939,305 | 7/1990 | Stenzenberger | 568/640 |
| 5,003,017 | 3/1991 | Eisenbarth et al. | 526/262 |
| 5,003,018 | 3/1991 | Repecka | 526/262 |
| 5,013,804 | 5/1991 | Kramer | 526/262 |
| 5,120,824 | 6/1992 | Stenzenberger | 528/322 |
| 5,143,969 | 9/1992 | Reck et al. | 524/548 |

*Primary Examiner*—Bernard Lipman
(74) *Attorney, Agent, or Firm*—Fitzpatrick, Cella, Harper & Scinto

(57) ABSTRACT

Thermosetting polymers with high temperature capability and superior oxidative stability for composite and adhesive applications are disclosed. These polymers are ideally suited for adhesives and RTM, resin film infusion, and prepreg methods to make polymer matrix, fiber reinforced composite parts.

25 Claims, No Drawings

THERMOSETTING POLYMERS WITH IMPROVED THERMAL AND OXIDATIVE STABILITY FOR COMPOSITE AND ADHESIVE APPLICATIONS

This application claims priority under 35 U.S.C. §119 from United States Provisional Application Ser. No. 60/006,452 (filed Nov. 13, 1995), which is incorporated by reference herein as if fully set forth.

TECHNICAL FIELD

This invention relates to heat curable bismaleimide resin systems and the preparation thereof. More particularly, the subject invention relates to the preparation of bismaleimide resins in which the bismaleimide reactants are slurry mixed at relatively low temperature into the remaining resin system components.

The subject Invention further relates to specific, solid diamine bismaleimide resin reactants reacted with a liquid propenyl benzophenone co-reactant to produce a thermosetting polymer. The resulting polymer has an unusually low weight loss during thermal treatment at high temperature.

BACKGROUND OF THE INVENTION

Bismaleimide resins are important resins in commerce for various uses, including fiber reinforced composite and structural adhesives. However, bismaleimide resins, while possessing high strength at elevated temperatures, tend to be somewhat brittle. Accordingly, it is common to modify the bismaleimides with additional comonomers to improve impact resistance.

Curable mixtures based on aromatic bismaleimides and propenyl compounds are known, for example, from H. D. Stenzenberger et al. ("Stenzenberger"), relating to various curable resins from bismaleimide and alkenyl phenyl hydroxy ether, and laminated articles produced from said resin as disclosed in U.S. Pat. Nos. 4,871,821, 4,917,954, 4,789,704, 4,939,305 and 5,120,824. The combination of a bismaleimide and a propenyl compound by slurry mixing Is not disclosed in any of the Stenzenberger patents.

Certain curable mixtures containing a bismaleimide and a propenyl compound are disclosed In A. Kramer, U.S. Pat. No. 5,013,804 ("Kramer"). Although various aromatic bismaleimides are contemplated, no disclosure, either as teaching or suggestion using methylenedianiline bismaleimide, is provided. Additionally, Kramer discloses a fusion process for bringing together a bismaleimide compound and a propenyl compound. Kramer does not teach or suggest the thermosetting polymer made, and the making thereof, using slurry mixing.

The process of slurry mixing bismaleimide resins is disclosed in L. Repecka, U.S. Pat. No. 5,003,018 ("Repecka"). Certain aromatic bismaleimides in combination with liquid co-reactants, like o,o'-diallylbisphenol A, are disclosed. All of the above mentioned patents are incorporated herein by reference.

Many comonomers are physically incompatible with the bismaleimide resins because following initial formulation at elevated temperatures, the bismaleimide component may crystallize during processing. The large crystals which then form result in a resin system which is heterogeneous, difficult to process and which may be prone to microcracking when used to prepare carbon fiber reinforced composites. In such a resin system, wherein the bismaleimide components are physically incompatible, adhesives and prepregs prepared therefrom by the conventionally prepared systems often do not have the drape and tack desired of them.

As a result, there is a need in this technical area for a bismaleimide resin that has a high temperature capability, superior oxidative stability, and acceptable tack and drape to make composite parts.

SUMMARY OF THE INVENTION

It has been surprisingly discovered that bismaleimide polymer systems made using specific bismaleimide components, specific co-reactant components as curing agents in an optimized formula and a slurry mixing technology, have unexpectedly improved thermal and oxidative stability when formed into composites adhesives, etc. Specifically, the novel formulation of the present Invention comprises a thermosettable curable resin composition prepared by slurry mixing a composition comprising a solid diamine bismaleimide resin reactant and a liquid propenyl benzophenone co-reactant in which the reactant and co-reactant are present in a weight ratio of substantially about 1:1. This particular composition has a decreased weight loss upon thermal aging and the tack and drape necessary to make composite parts.

This invention also relates to a process for preparing a thermosettable curable resin composition by slurry mixing a powdered bismaleimide resin reactant into a liquid co-reactant which has been heated to between 50° C. and 150° C.

DESCRIPTION OF THE PREFERRED EMBODIMENTS

The process of the subject invention involves the slurry mixing of one or more solid bismaleimide monomers with the other resin system components. After cooling the bismaleimide resin systems thus obtained, very fine bismaleimide particles in the form of a stable dispersion are present. Upon standing, substantial crystallization of additional bismaleimide will not occur. The resulting heat-curable resin system is thus uniform and homogeneous.

In this application, the solid bismaleimide monomers may alternatively be described as a "specific bismaleimide component," "a solid reactant" and "solid aromatic diamine bismaleimide resin reactant."

The liquid co-reactant may be described to include a "curing agent", a "propenyl compound", a "liquid homogeneous benzophenone co-reactant" and an "incompatible comonomer(s)."

The term "resin composition" as used herein refers to a heat-curable resin composition in its final form. The composition may contain one or more reactive monomers and/or comonomers, curing agents, any necessary catalysts, and optionally filler, rheology control agents, tackifiers, tougheners, diluents, dyes, and pigments, but exclusive of fiber reinforcement.

The term "incompatible comonomer(s)" as used herein refers to comonomers and other ingredients which, when present, would allow crystallization of a particular bismaleimide component upon cooling a melt of such components. The incompatible comonomer may thus comprise one or more additional components having chemical functionalities other than maleimide, as well as other bismaleimide comonomers.

For example, it might be found that homogeneous melt of specific quantities of a particular bismaleimide monomer and a comonomer, might not present a problem with regard to crystallization of the bismaleimide on cooling. However, when a second bismaleimide, or when more of the first bismaleimide are added to the melt, substantial crystallization might occur under the same conditions. The resulting crystallization indicates incompatibility, in the sense used by the inventor, between the added bismaleimide and the other ingredients. Such incompatibility is most likely to result when high concentrations of bismaleimides are utilized, particularly when high concentrations of a single or limited number of bismaleimides are utilized.

The use of slurry mixing in the preparation of bismaleimide resin systems containing incompatible components is but one mode of practicing the subject invention. This mode is important when large quantities of crystalline bismaleimides are contained in the resin formulation, as such formulations, when prepared by fully dissolving, are frequently very difficult to process. The slurry mixing process has been found to be useful whether or not the overall resin system components are compatible. Such resin system may result when a compatible rather than an incompatible comonomer is utilized. An example of the latter might be the use of a bismaleimide monomer and a cyanate-functional comonomer.

Slurry mixing is merely an aid in preparing the resin of the invention. It should be noted that slurry mixing is not required for good resistance to oxidation. Good resistance to oxidation is a function of the monomers, not the process for preparation. However, for prepreg and adhesive applications, the invention will most likely be practical using slurry mixing. In other applications, for example, resin transfer molding (RTM), slurry mixing may not be needed.

The resin system, upon cooling, will generally not show the presence of large or substantial amounts of crystals. In some cases, the resin system may have the appearance of a solid solution or glass. Yet despite the uniform appearance, these uncured resin systems frequently possess virtually no tack, and often are highly brittle. Surprisingly, when the same components are slurry mixed, the resulting resin system has excellent tack and drape.

The term "a weight ratio of substantially about 1:1" as used herein relates to the weight ratio of the solid reactant and the liquid co-reactant, but not diluents or other polymer components. The solid reactant is generally present in a weight ratio of about 1:1 with the liquid co-reactant. The term "substantially about" as used herein indicates that the ratio may vary to a limited extent and would still be considered a part of the present invention. The weight ratio may vary from about 1:1.5 solid reactant:liquid co-reactant to about 1.5:1 solid reactant:liquid co-reactant. Preferably, however, the weight ratio is about 1:1 solid reactant:liquid co-reactant.

The term "decreased weight loss" as used herein relates to a comparison of the weight loss of cured composites after the composites have been heat treated. Thermal aging is used to determine the effect on the resin and the composite materials after dormant treatment with heat over a period of time in air. It is expected that the components of the resin and composite will be oxidized during the aging process. Correlation can be made in the stability of a particular composite structure by comparing the weight loss from the composite structure after thermal aging. Generally, thermal aging takes place over a period of time at a particular temperature. For purposes of this invention, the time for such aging may range from one day to several years. For test purposes, the time of thermal aging used was from three weeks to nine weeks. For purposes of this invention, the temperature in which the thermal aging was evaluated ranges from about 200° C. to 300° C., with a preferred temperature ranging from 220° C. to 280° C. These times and temperatures are used for an accelerated evaluation of composite.

The claimed heat-curable resin systems of the subject invention contain (excluding inorganic fillers, fibers and non-bismaleimide and co-reactant resin materials) from between about 20 to 80 percent by weight of one or more solid bismaleimide reactants. Preferably, the solid bismaleimide reactants are present from between about 40 to 60 percent by weight of the total resin composition. The claimed heat-curable system also contains from between about 20 to 80 percent by weight of one or more co-reactants (excluding inorganic fillers, fibers and bismaleimide and non-co-reactant resin materials). Preferably, the liquid co-reactants are present from between about 40 to 60 percent by weight of the total resin composition. Preferably, the bismaleimide reactant and the liquid co-reactant have a high amount of aromatic groups. Bismaleimide of certain structures have unexpectedly been found to have significantly improved oxidative stability.

Most preferably, the solid reactant and the liquid co-reactant is greater than about 70 percent and close to 100 percent total weight of the composition upon curing. The comonomer may include the liquid co-reactant. However, in this invention, the comonomer, other than the liquid co-reactant, is about 20 percent total weight or less of the composition upon curing. As a most preferred example of this invention, MDA-BMI (as a solid reactant) is combined with PPB (as a liquid co-reactant) in a 1:1 weight ratio, the combined weight of which is close to 100 percent total weight of the resin composition upon curing. Also, the solid bismaleimide is preferred to have a mean size of less than 100 μm, preferably less than 20 μm, such that a substantial portion of the solid bismaleimide does not dissolve in the liquid portion.

A number of suitable bismaleimide monomers exist. The common feature for this monomer is that it must be highly aromatic and preferably have more than one aromatic group. Groups connecting to the aromatic ring can be methylene, isopropylidene, oxygen, sulfone or sulfide. Such bismaleimides when used in the invention have been found to have markedly improved oxidative stability as a result of thermal aging in air. Pendant aliphatic groups are detrimental, for example, methyl, ethyl, n-propyl, i-propyl and the like. However, the presence of methylene groups in the solid reactant tends to increase stability of the aromatic nucleus against oxidation. For the purpose of this invention, methylene dianiline bismaleimide (MDA-BMI) is preferred. Other preferred solid bismaleimide reactants of this invention include bis(aminophenoxyphenyl)propane bismaleimide (BAPP-BMI), oxydianiline bismaleimides (ODA-BMI), bis(aminophenoxy)benzene bismaleimides (APB-BMI), diaminodiphenylsulfone bismaleimides (DADS-BMI), diaminodiphenylisopropylidines, dlaminodiphenylketones, diaminodiphenyl sulfides, diaminodiphenyl hexafluoroisopropylidines, bis(diaminodiphenylisopropylidine)benzenes, and the like. Certain commercially available eutectic mixtures of BMI monomers containing methylene dianiline-bismaleimide (MDA-BMI), toluene dianiline bismaleimide (TDA-BMI) and trimethylenehexamethylenediamine-bismaleimide, and the like are not as stable to the thermal aging process.

Wholly aliphatic bismaleimides, for example, hexamethylenediamine-bismaleimides can be used in small amounts to increase tack as long as the thermal aging properties are still acceptable.

Bismaleimide monomers are well known to those skilled in the art, and are generally prepared by the reaction of maleic anhydride, or substituted maleic anhydride, with a suitable diamine. Both aromatic and aliphatic diamines are suitable for the preparation of the bismaleimide. Suitable diamines for the preparation of bismaleimides also include other aromatic diamines such phenylenediamine, diaminodiphenylsulfones, diaminodiphenylisopropylidenes, diaminodiphenylketones, diaminodiphenyloxides and diaminodiphenylsulfides.

Bismaleimides derived from diamines containing heteroatoms are also useful, for example those derived from amino terminated polyethersulfones, polyetherketones, polyetherketoneketones, polyetheretherketones and similar oligomers as prepared in accordance with U.S. Pat. No. 4,175,175, as well as amino terminated polyoxyalkylene polyethers, amino terminated N,N-dialkylpiperldines, and the like.

Also useful are polyaminobismaleimide prepolymers which may be prepared through the reaction of a stoichiometric excess of one or more bismaleimides with a di- or polyamine. Such polyaminobismaleimides or related products may also be prepared in situ by including In the resin system, one of the aforementioned diamines, preferably one of the diaminodiphenylsulfones.

Preferred comonomers are the alkenylphenols and alkenyloxyphenyls. Suitable are, for example, o,o'-diallyl- and o,o'-dipropenylbisphenols such as o,o'-diallyl- and o,o'-dipropenylbisphenol A, bisphenol F and/or bisphenol S. Also suitable are the alkenylphenol- and alkenyloxyphenyl terminated dicyclopentadienes. The latter are prepared by first forming the phenolated dicyclopentadiene precursor as taught in U.S. Pat. No. 3,536,734. The precursor is then reacted with the requisite alkenylhalide such as allyl chloride or propenyl chloride in the presence of base to form the ally or propenyl ether. These ethers may be used as such or may be isomerized through Claisen rearrangement to the ortho substituted phenol. Various other comonomers are described in U.S. Pat. No. 5,003,018, which are incorporated herein by reference.

The resin system of the subject invention may contain one or more comonomers. These comonomers may be comonomers which react with the bismaleimide monomers, or which react with themselves or with other comonomers or may be the same or a different bismaleimide resin in liquid form. Such comonomers include, for example, those discussed in U.S. Pat. Nos. 4,100,140 and 4,035,345. which are incorporated herein by reference. Allylnadicimide resins, epoxy resins, di- and polyamines, cyanate resins, unsaturated polyester resins, and alkenylphenol-terminated oligomeric tougheners similar to those disclosed in European published application 230,741 are useful. Silicone rubbers may also be utilized as comonomers, particularly those terminated with maleimide, epoxy, vinyl and amino groups. In addition to such comonomers, the resin systems of the subject invention may also include engineering thermoplastic tougheners, particularly polyimides, polyetherimides, polyetherketones, polyarylenesulfides, polyarylenesulfones, polyethersulfones, and the like. Such thermoplastic tougheners should have glass transition temperatures, Tg, In excess of about 100° C.

Suitable epoxy comonomer resins are disclosed in the treatise Handbook of Epoxy Resins, McGraw-Hill, Inc., 1967. Examples of such resins are the bisglycidyl ethers of the bisphenols, particularly bisphenol A, bisphenol F and bisphenol S. Also suitable are the various phenolic and cresolic novolac-type resins, as well as the various glycidoxy amines and aminophenols, particularly N,N,N',N'-tetrakis(glycidyl)-4,4'-diaminodiphenylmethane and N,N,O-tris(glycidyl)-4-aminophenol. Epoxy resin based on the glycidyl ethers of the various dihydroxynaphthalenes and phenolated dicyclopentadienes are also suitable.

Cyanate functional comonomers are also useful. Such monomers are prepared by the reaction of cyanogen chloride or bromide with a diol or polyol. Examples of suitable diols include the bisphenols, the tetramethylbisphenols, other cyanates commercially available and in the literature, resorcinol, the hydroxyalkcyanurates and isocyanurates and the like. Such cyanate systems are well known to those skilled in the art, and are commercially available from a number of sources. Their preparation is also well known, and may be accomplished by the methods proposed in U.S. Pat. No. 4,546,131. Cyanate resins might need a catalyst.

The resin systems of this invention may also include other components, some of which may also affect the compatibility of the bismaleimide monomers. Catalysts are generally present, for example, in amounts of from 0.01 percent to about 5.0 percent by weight. Preferred catalysts include triphenylphosphine, the various tertiary amines, imidazoles, or diamines. The comonomers may require a catalyst for their polymerization. The system may also contain various dyes, pigments, fillers and rheology control agents. These additional components are well known to those skilled in the art.

A radical inhibitor has been found useful to stabilize the resin and prepreg. One inhibitor, hydroquinone, is particularly advantageous. The prepreg keeps tack longer with 0.05% hydroquinone, and therefore hydroquinone is used in most commercial applications. Hydroquinone at 0.05% also increases 150° C. gel time by 50% or more after room temperature storage in MDA/propenyl phenoxy benzophenone compositions, which is useful in most applications, especially resin transfer molding applications.

The resin systems of the subject invention are preferably prepared by dispersing the bismaleimide into the incompatible liquid co-reactant in such a manner that a uniform dispersion is obtained. The process of forming such dispersions is termed "slurry mixing" and may be accomplished through several means. Some of these means are described below, while other equivalent means will readily suggest themselves to those skilled in the art of resin formulating.

In order to form stable dispersions of this invention, the average particle size (by volume) of the solid bismaleimide component must be kept below 100 $\mu$m, preferably, below 50 $\mu$m. The bismaleimide particle size may be obtained through traditional methods of size reduction, for example, by precipitation from solution, air-jet milling, three-roll milling or high-shear mixing. Preferably, the desired particle size is achieved through jet milling.

The liquid phase of the resin system may be defined as that portion of the resin system exclusive of the solid bismaleimide particles or other components. The liquid phase may also, in certain cases, contain compatible comonomers and liquid or dissolved bismaleimides. The liquid phase should have a low glass transition temperature, the value of which is dependent upon the particular application.

By the term "liquid comonomer" is meant those components of the total resin system which, during the slurry mixing process, constitute the continuous phase. These components may be liquids, preferably viscous liquids, at room temperature. Examples of such liquid comonomers suitable for formulation in this invention includes eutectic blends of bismaleimides, other resin systems such as resorcinol diglycidylether (RDGE), cis-stilbene (C-STIL), trans-stilbene (T-STIL), diallylbisphenol A (DABA), various epoxy and cyanate resins.

The liquid co-reactant can be monofunctional or bi-functional. Generally, it is preferred to have a high ratio of aromatic moieties to other groups. Examples of preferable bi-functional liquid co-reactants include, but are not limited to 4,4'-bis[O-(1-propenyl)-phenoxy]benzophenone ("PPB") and 2,6-bis[O-(1-propenyl)phenoxy]pyridine ("PPP"). Monofunctional co-reactants having only one alkenyl group are also a part of the preferred embodiment. Such substances in general, have lower molecular weight compared to substances with two alkenyl groups, and hence, lower viscosity which will impart prepreg tack. The monofunctional co-reactants can also have a high ratio of aromatic to aliphatic groups, thus do not reduce oxidative stability. It is generally preferable to have primarily a bi-functional curing agent because monofunctional curing agents tend to reduce the bonding in the molecular network and can reduce Tg. An example of a monofunctional modifier is (3-allyl-2-hydroxylphenyl) benzene.

The liquid phase preferably has a Tg of about room temperature or less. These low Tgs are desirable in order that the product, when in adhesive film or prepreg form, may have adequate tack and drape. If the viscosity or Tg of the liquid phase is too low, it may be raised to higher values by dissolving a portion of the bismaleimide into the other components in the traditional manner. Care must be taken to avoid dissolving so much bismaleimide at higher temperatures that the low temperature solubility is appreciably exceeded, as under these conditions bismaleimide may crystallize out. This crystallization is promoted by the presence of dispersed, solid bismaleimide in the finished resin system which may serve as nucleation sites for crystallization. If only minor amounts of crystallization take place, the nonhomogeneity thus produced may be attenuated by further processing, such as three-roll milling. However, if substantial amounts of crystallization takes place, the product must be reworked or scrapped.

In the most preferred embodiment of this invention, slurry mixing of the resin system is accomplished by dispersing the required quantity of bismaleimide in fine particle form, preferably as less than 50 $\mu$m particles, into the liquid phase. The slurry mixing generally takes place at a modestly elevated temperature, preferably from 30° C. to about 150° C., but below the temperature at which the particular bismaleimide is soluble or miscible with the remaining components. At these relatively low temperatures, only a minor portion of the bismaleimide, if any, will dissolve into the continuous phase despite the small particle size of the bismaleimide.

Conventional high shear mixing equipment may be utilized. The cure catalyst may also be added at this stage. The uniform dispersion thus obtained may be proceeded on a three-roll mill, or may be directly coated onto silicone release paper for use as an adhesive or as a hot melt prepregging resin. Matrix resins prepared by this technique are particularly suitable for carbon/graphite and glass fiber applications.

For the purpose of this invention, where highest oxidative stability is not necessary, mixtures of less oxidatively stable co-reactants with bismaleimides is also a preferable part of this invention. For example, mixtures of (4,4'-bis[O-(1-propenyl)phenoxy]benzophenone)(PPB) and (2,6-bis[O-(1-propenyl)phenoxy]benzophenone) (PPP), or PPP and diallylbisphenol A (DABA) may be particularly suitable In some applications.

A preferred embodiment is that a substantial portion of the solid bismaleimide remain in solid form. The term "substantial portion" is best defined in terms of the amount of solid bismaleimide which does dissolve during the slurring mixing process when practiced by adding fine particle size bismaleimide to the liquid coingredients. This portion must be such that following the slurry mixing process, the resin film or prepreg prepared from the heat-curable resin system has the desired tack and drape, and that substantial crystallization of the solid bismaleimide component(s) does not occur.

For example, in many systems, the portion of solid bismaleimide which dissolves during mixing and prepreg manufacture will be close to zero weight percent, and is generally less than about 20 weight percent of the total solid bismaleimide component added. However, in some cases, an appreciable amount of solid bismaleimide which remains in solid form will vary along with the other system components. Preferably, the amount of solid bismaleimide which dissolves during slurry mixing will not appreciably exceed the storage temperature solubility of that particular bismaleimide. The "substantial amount" of bismaleimide remaining in solid form may, in some cases, be as low as 10 weight percent of added solid bismaleimide, but is generally and preferably much higher.

Various prophetic examples that clarifies the term "substantial portion" are found in U.S. Pat. No. 5,003,018, which is incorporated herein by reference.

A less preferable means of slurry mixing the components in accordance with the subject invention is to heat the bismaleimide component above its melting point and add it slowly to the continuous phase under conditions of high shear. The mixing may be cooled down to a temperature below the melting point of the bismaleimide either before the start of liquid bismaleimide addition, during the course of the addition, or following the addition. However, it is necessary that the high shear conditions be maintained during the addition and cooling processes in order that the desired bismaleimide fine particles size may be maintained. This method is impractical when using bismaleimides with particularly high melting points. It is also not of use, and therefore not within the scope of this invention when the liquid system is prone to supercooling. Under these conditions, a metastable resin system, initially containing no solid bismaleimide dispersed therein, will be retained.

In another, less preferred method, the solid bismaleimide is added in the form of relatively coarse particle to the continuous phase under high shear such that the shear forces result in rapid size reduction to a range below 20 $\mu$m, preferably from 1 to 5 $\mu$m. Shear mixers suitable to create the desired conditions are available commercially. When using such high shear mixers, the resin mixtures must often be cooled, as the heat buildup which results from the high energy shear conditions would otherwise raise the temperature of the resin by an undesirably high amount. The temperature must be kept appreciably below the temperature at which complete solubility of the solid bismaleimide would result.

A further means of practicing the subject invention is to first fuse together at least a portion the resin ingredients, including a portion of the total bismaleimide component, in a conventional manner. Then, the additional solid bismaleimide is added at a lower temperature, either as fine particles of suitable size, or as larger particles followed by in situ size reduction, for example by using the high shear mixing technique previously described.

The mixing temperature is critical to the optimal use of the process of the subject invention. This temperature should be as low as is practical for the resin components involved. For example, if suitable high torque mixers are available, slurry mixing of bismaleimides into even highly viscous comonomers may be accomplished at room temperature or below. However, it is frequently desirable to elevate the mixing temperature by a modest amount. With comonomers which are solid at room temperature or too highly viscous, elevated temperatures may be necessary. The most desirable temperature may easily be determined by one of ordinary skill in the art.

The slurry mixing method described below is used to improve processing, increase "tack" and increase room temperature storage stability. The solid monomer (solid reactant) remained as solids in a slurry. This method is also a necessary component of the invention as the resin could not be made without slurry mixing and still have good prepreg tack and drape and slurry mixing gives the impregnated fibers (prepreg) good room temperature storage stability.

The procedures for conducting the weight loss test consisted of preparing test specimens, 5 cm×12.5 cm from the cured test panels. These test specimens were weighted and then allowed to stand in an air circulating oven at 232° C. or 260° C. The specimens were weighted after 6 weeks for weight loss due to oxidation. The percent weight loss was calculated by dividing the weight after 6 weeks aging by the initial weight and multiplying by 100, then subtracting that product from 100. The data is reported in the Table. The test was analyzed by comparing the weight loss of the various composites. The lower the weight loss the more oxidatively stable the composite.

The following specific examples are intended to illustrate certain aspects of the present invention; they are not to be construed as limitations thereof.

EXAMPLE 1

PPB with 0.1% hydroquinone ("HQ") was heated at 120° C. until complete solution was achieved. 50 parts (w/w) of PPB with HQ were heated to between 70° C. to 95° C. followed by addition of 50 parts (w/w) of the ground MDA-BMI and 0.05 parts (w/w) hydroquinone. The hydroquinone was heated at 121° C. until all hydroquinone had dissolved. This "slurry" mixture was stirred until homogeneous. This pre-polymer resin at 70° C. to 95° C. was metered onto silicone release paper, then pressed (impregnated) into T-300 3K 70P Type carbon fiber fabric. The resin content was 30–35%, the balance being carbon fiber. This impregnated fabrics were stacked 12 plies thick. Test panels were prepared by placing the stacks into a "vacuum bag" followed by heating in an autoclave at 85 psi at 227 for 6 hours. The test specimens were cut from the panels and tested for weight loss according to the procedures described above. The weight loss of the cured composite at 232° C. is 0.68% and at 260° C. is 1.62%.

EXAMPLE 2

(Comparative)

40 parts (w/w) of DABA and 0.15 parts of TPP were heated to between 70° C. to 95° C. followed by addition of 60 parts (w/w) of the ground MDA-BMI. This "slurry" mixture was stirred until homogenous to make the pre-polymer resin. This pre-polymer resin was then metered, impregnated, autoclave cured and tested the same way as In Example 1. The weight loss of the cured composite at 232° C. is 2.14% and at 260° C. is 4.53%.

EXAMPLE 3

(Comparative)

25 parts (w/w) of PPB with 0.1% hydroquinone (HQ) and 25 parts (w/w) DABA were heated to between 70° C. to 95° C. followed by addition of 50 parts (w/w) of the ground MDA-BMI. This "slurry" mixture was stirred until homogenous to make the pre-polymer resin. This pre-polymer resin was then metered, impregnated, autoclave cured and tested the same way as In Example 1. The weight loss of the cured composite at 232° C. is 1.22% and at 260° C. is 2.99%.

EXAMPLE 4

47.5 parts (w/w) of PPB with HQ and 5 parts (w/w) of RDGE were heated to between 70° C. to 95° C. followed by the addition of 47.5 parts (w/w) of the ground MDA-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 0.91% and at 260° C. is 1.74%.

EXAMPLE 5

50 parts (w/w) of PPB with HQ and 10 parts (w/w) of CPMI were heated to between 70° C. to 95° C. followed by addition of 40 parts (w/w) of the ground MDA-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 0.65% and at 260° C. is 2.58%.

EXAMPLE 6

40 parts (w/w) of PPB with HQ and 10 parts (w/w) of CPMI were heated to between 70° C. to 95° C. followed by addition of 50 parts (w/w) of the ground MDA-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 0.73% and at 260° C. is 1.57%.

EXAMPLE 7

45 parts (w/w) of PPB with HQ and 5 parts (w/w) of C-STIL were heated to between 70° C. to 95° C. followed by addition of 50 parts (w/w) of the ground MDA-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 0.64% and at 260° C. is 1.50%.

EXAMPLE 8

40 parts (w/w) of PPB with HQ and 10 parts (w/w) of T-STIL were heated to between 70° C. to 95° C. followed by addition of 50 parts (w/w) of the ground MDA-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 0.75% and at 260° C. is 1.83%.

EXAMPLE 9

40 parts (w/w) of PPB with HQ and 10 parts (w/w) of TPE were heated to between 70° C. to 95° C. followed by addition of 50 parts (w/w) of the ground MDA-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 0.69% and at 260° C. is 1.72%.

EXAMPLE 10

(Comparative)

50 parts (w/w) of PPB with HQ were heated to between 70° C. to 95° C. followed by addition of 50 parts (w/w) of the ground TDA-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 2.47% and at 260° C. is 7.63%.

EXAMPLE 11

(Comparative)

50 parts (w/w) of PPB with HQ were heated to between 70° C. to 95° C. followed by addition of 50 parts of (w/w) of the ground BMI-MP. This "slurry" mixture was stirred until homogenous to make the pre-polymer resin. This pre-polymer resin was then metered, impregnated, autoclave cured and tested the same way as in Example 1. The weight loss of the cured composite at 232° C. is 1.60% and at 260° C. is 3.17%.

EXAMPLE 12

50 parts (w/w) of PPB with HQ were heated to between 70° C. to 95° C. followed by addition of 30 parts (w/w) of ground MDA-BMI and 20 parts (w/w) of ground BAPP-BMI. This "slurry" mixture was stirred until homogenous to make the pre-polymer resin. This pre-polymer resin was then metered, impregnated, autoclave cured and tested the same way as In Example 1. The weight loss of the cured composite at 232° C. is 0.79% and at 260° C. is 1.64%.

EXAMPLE 13

50 parts (w/w) of PPB with HQ were heated to between 70° C. to 95° C. followed by addition of 40 parts (w/w) of ground MDA-BMI and 10 parts (w/w) of ground BAPP-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 0.79% and at 260° C. is 1.58%.

EXAMPLE 14

49.5 parts (w/w) of PPB with HQ and 1 part (w/w) of hydroquinone were heated to between 70° C. and 95° C. followed by addition of 49.5 parts (w/w) of ground MDA-BMI. This "slurry" mixture was stirred until homogenous to make the pre-polymer resin. This pre-polymer resin was then metered, impregnated, autoclave cured and tested the same way as in Example 1. The weight loss of the cured composite at 232° C. is 0.72% and at 260° C. is 1.62%.

EXAMPLE 15

(Comparative)

60 parts (w/w) of C-796 were heated to between 70° C. to 95° C. until homogenous followed by addition of 40 parts (w/w) of PPB with HQ. This mixture was stirred until homogenous to make the pre-polymer resin. This pre-polymer resin was then metered, impregnated, autoclave cured and tested the same way as in Example 1. The weight loss of the cured composite at 232° C. is 1.12% and at 260° C. is 2.54%.

EXAMPLE 16

(Comparative)

60 parts (w/w) of C-353A were heated to between 70° C. to 95° C. until homogenous followed by addition of 40 parts (w/w) of PPB with HQ. This mixture was stirred until homogenous to make the pre-polymer resin. This pre-polymer resin was then metered, impregnated, autoclave cured and tested the same way as in Example 1. The weight loss of the cured composite at 232° C. is 1.12% and at 260° C. is 2.54%.

EXAMPLE 17

50 parts (w/w) of C-353A were heated to between 70° C. to 95° C. until homogenous followed by addition of 50 parts (w/w) of PPB with HQ. This mixture was stirred until homogenous to make the pre-polymer resin. This pre-polymer resin was then metered, impregnated, autoclave cured and tested the same way as in Example 1. The weight loss of the cured composite at 232° C. is 0.97% and at 260° C. is 2.18%.

EXAMPLE 18

(Comparative)

50 parts (w/w) of PPP were heated to between 70° C. to 95° C. followed by addition of 50 parts (w/w) of the ground MDA-BMI. This "slurry" mixture was stirred until homogenous to make the prepolymer resin. This pre-polymer resin was then metered, impregnated, autoclave cured and tested the same way as in Example 1. The weight loss of the cured composite at 232° C. is 1.38% and at 260° C. is 10.78.

EXAMPLE 19

25 parts (w/w) of PPP and 25 parts of PPB were heated to between 70° C. to 95° C. followed by addition of 50 parts (w/w) of the ground MDA-BMI. This "slurry" mixture was stirred until homogenous to make the pre-polymer resin. This pre-polymer resin was then metered, impregnated, autoclave cured and tested the same as in Example 1. The weight loss of the cured composite at 232° C. is 0.94% and at 260° C. is 2.32%.

TABLE

| EXAMPLE | BMI COMPONENTS | NON-BMI COMPONENTS | Weight loss at 232° C. (%)[1] | Weight Loss at 260° C. (%)[1] |
|---|---|---|---|---|
| 1 | MDA-BMI 50 | PPB 50 | 0.68 | 1.62 |
| 2C | MDA-BMI 60 | DABA 40 (0.15% TPP) | 2.14 | 4.53 |
| 3C | MDA-BMI 50 | DABA 25 PPB 25 | 1.22 | 2.99 |
| 4 | MDA-BMI 47.5 | PPB 47.6 RDGE 5 | 0.91 | 1.74 |
| 5 | MDA-BMI 40 CPMI 10 | PPB 50 | 0.65 | 2.58 |

TABLE-continued

| EX-AMPLE | BMI COM-PONENTS | NON-BMI COM-PONENTS | Weight loss at 232° C. (%)[1] | Weight Loss at 260° C. (%)[1] |
|---|---|---|---|---|
| 6 | MDA-BMI 50 CPMI 10 | PPB 40 | 0.73 | 1.57 |
| 7 | MDA-BMI 50 | PPB 45 C-STIL 5 | 0.64 | 1.50 |
| 8 | MDA-BMI 50 | PPB 40 T-STIL 10 | 0.75 | 1.83 |
| 9 | MDA-BMI 50 | PPB 40 TPE 10 | 0.69 | 1.72 |
| 10C | TDA-BMI 50 | PPB 50 | 2.47 | 7.63 |
| 11C | BMI-MP 50 | PPB 50 | 1.60 | 3.17 |
| 12 | MDA-BMI 30 BAPP-BMI 20 | PPB 50 | 0.79 | 1.64 |
| 13 | MDA-BMI 40 BAPP-BMI 10 | PPB 50 | 0.79 | 1.58 |
| 14 | MDA-BMI 49.5 | PPB 49.5 HYDRO 1.0 | 0.72 | 1.62 |
| 15C | C-796 60 | PPB 40 | 1.12 | 2.54 |
| 16C | C-353A 60 | PPB 40 | 1.12 | 2.54 |
| 17 | C-353A 50 | PPB 50 | 0.97 | 2.18 |
| 18C | MDA-BMI 50 | PPP 50 | 1.38 | 10.78 |
| 19 | MDA-BMI 50 | PPB 25 PPP 25 | 0.94 | 2.32 |

[1]Six weeks aging at the indicated temperature

It will be appreciated that variations and modifications to the products and methods can be made by the skilled person without departing from the spirit or scope of the invention as defined in the appended claims.

What is claimed is:

1. A thermosettable resin system comprising:

A. a solid aromatic diamine bismaleimide resin of the formula:

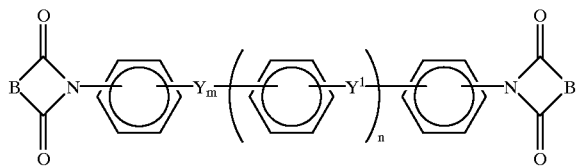

wherein m is 0 or 1; n is 0 or higher; B is a substituted or unsubstituted carbon carbon double bond; each Y is independently selected from the group consisting of —CO—, —CH$_2$—, —CRH—, —CR$_2$—, —SiR$_2$—, —C(CF$_3$)$_2$—, —S—, —SO—, —SO$_2$—, —O—, and —CO$_2$—; R is an alkyl or a phenyl group; and wherein the foregoing aromatic groups contain no pendant aliphatic groups; and B. a liquid alkenylphenyl resin of the formula:

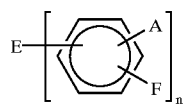

wherein n is 1 or 2; A is an alkenyl group; F is selected from the group consisting of hydrogen, alkoxy, phenyl, phenylphenoxy, or phenoxy; and when n is 1, E is selected from the group consisting of hydrogen, phenyl, phenoxy, phenylphenoxy, or a radical of either formula (a) or formula (b);

wherein formula (a) is

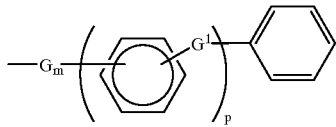

m is 0 or 1; p is 0 or higher; each G is independently selected from the group consisting of —CO—, —CH$_2$—, —CRH—, —CR$_2$—, —SiR$_2$—, —C(CF$_3$)$_2$—, —S—, —SO—, —SO$_2$—, —O—, and —CO$_2$—; and R is an alkyl or a phenyl group; and wherein formula (b) is:

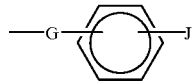

G is selected from the group consisting of —CO—, —CH$_2$—, —CRH—, —CR$_2$—, —SiR$_2$, —C(CF$_3$)$_2$—, —S—, —SO—, —SO$_2$—, —O—, and —CO$_2$—; R is an alkyl or a phenyl group:

and J is selected from the group consisting of hydrogen, phenyl, phenoxy, phenylphenoxy, alkoxy, chloro, or fluoro; and when n is 2, E is a divalent radical selected from the group consisting of formula (c), formula (d) and formula (e);

wherein formula (c) is:

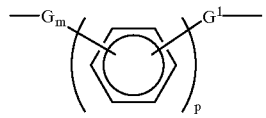

m is 0 or 1; p is 0 or higher; each G is independently selected from the group consisting of —CO—, —CH$_2$—, —CRH—, —CR$_2$—, —SiR$_2$—, —C(CF$_3$)$_2$—, —S—, —SO—, —SO$_2$—, —O—, and —CO$_2$—; and R is an alkyl or a phenyl group;

wherein formula (d) is:

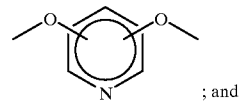

; and wherein formula (e) is:

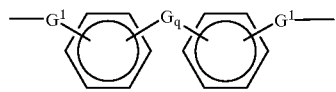

q is 0 or 1; each G is independently selected from the group consisting of —CO—, —CH$_2$—, —CRH—, —CR$_2$—, —SiR$_2$—, —C(CF$_3$)$_2$—, —S—, —SO—, —SO$_2$—, —O—, and —CO$_2$—; and R is an alkyl or a phenyl group;

wherein the resin system after curing exhibits decreased weight loss upon thermal aging.

2. The thermosettable resin system of claim 1, wherein;

A. the solid bismaleimide resin is selected from the group consisting of methylenedianiline bismaleimides (MDA-BMI), bis(aminophenoxyphenyl)propane bismaleimides, bis(aminophenoxyphenyl)isopropylidene bismaleimides (BAPP-BMI), oxydianiline bismaleimides (ODA-BMI), bis(aminophenoxy)benzene bismaleimides (APB-BMI), diaminodiphenylsulfone bismaleimides (DADS-BMI), diaminodiphenylisopropylidine bismaleimides, diaminodiphenylketone bismaleimides, diaminodiphenyl sulfide bismaleimides, diaminodiphenylhexafluoroisopropylidine bismaleimides and bis(aminophenylisopropylidene)benzene bismaleimides; and B. the liquid alkenylphenyl resin is selected from the group consisting of bis(alkenylphenoxy)benzophenones, bis(alkenylphenoxy)pyridines, and alkenylphenylphenols.

3. The thermosettable resin system of claim 2, wherein the bismaleimide resin is MDA-BMI.

4. The thermosettable resin system of claim 2, wherein the alkenylphenyl resin is 4,4'-bis[O-(1-propenyl)-phenoxy] benzophenone ("PPB").

5. The thermosettable resin system of claim 2, wherein
   A. said bismaleimide resin is an MDA-BMI; and
   B. said liquid alkenylphenyl resin is selected from the group consisting of PPB and 2,6-bis[O-(1-propenyl)phenoxy]pyridine ("PPP").

6. The thermosettable resin system of any of claims 1–5, wherein a cured composite comprised of the resin system and carbon fabric exhibits a weight loss upon thermal aging of less than or equal to 0.97% after standing in an air circulating oven at 232° C. for six weeks, under the conditions set forth in the specification.

7. The thermosettable resin system of claim 2, wherein the bismaleimide resin is 47.5 parts (w/w) of MDA-BMI, the alkenylphenyl resin is 47.5 parts (w/w) of PPB, and further comprising 5 parts (w/w) of RDGE.

8. The thermosettable resin system of claim 2, wherein the bismaleimide resin is 50 parts (w/w) of MDA-BMI, the alkenylphenyl resin is 45 parts (w/w) of PPB, and further comprising 5 parts (w/w) of C-STIL.

9. The thermosettable resin system of claim 2, wherein the bismaleimide resin is 50 parts (w/w) of MDA-BMI, the alkenylphenyl resin is 40 parts (w/w) of PPB, and further comprising 10 parts (w/w) of a comonomer selected from the group consisting of T-STIL and TPE.

10. The thermosettable resin system of claim 2, wherein the bismaleimide resin is 30 parts (w/w) of MDA-BMI and 20 parts (w/w) of BAPP-BMI, and wherein the alkenylphenyl resin is 50 parts (w/w) of PPB.

11. The thermosettable resin system of claim 2, wherein the bismaleimide resin is 40 parts (w/w) of MDA-BMI and 10 parts (w/w) of BAPP-BMI, and wherein the alkenylphenyl resin is 50 parts (w/w) of PPB.

12. The thermosettable resin system of any of claims 1–5, wherein said bismaleimide resin and said liquid alkenylphenyl resin are present in a weight ratio of from about 1:1.5 to about 1.5:1.

13. The thermosettable resin system of claim 12, wherein said weight ratio is substantially about 1:1.

14. A crosslinked polymer prepared by heating the thermosettable resin system of any of claims 1–5 under sufficient pressure and temperature conditions, and for a time sufficient to cure the thermosettable resin system.

15. A process for preparing the thermosettable resin system of any of claims 1–5, comprising the steps of (A) dispersing a desired quantity of the bismaleimide resin in fine particle form into a liquid phase, which contains the liquid alkenylphenyl resin, at a temperature such that a substantial portion of the solid bismaleimide remains in solid form after mixing, and (B) obtaining a uniform dispersion of the bismaleimide resin in the liquid phase.

16. The process of claim 15, wherein said temperature is from about 30° C. to about 150° C.

17. The process of claim 15, wherein said bismaleimide resin has an average particle size (by volume) of less than 100 $\mu$m.

18. The process of claim 15, wherein said bismaleimide resin has an average particle size of less than 50 $\mu$m.

19. A process for preparing the thermosettable resin system of any of claims 1–5, comprising the steps of dispersing a desired quantity of the bismaleimide resin in relatively coarse particle form into a liquid phase, which contains the liquid alkenylphenyl resin, under high shear forces, such that the size of the bismaleimide particles are rapidly reduced to a range below 20 $\mu$m, while keeping the temperature of the mixture below the temperature at which complete solubility of the solid bismaleimide would result.

20. A process for preparing the thermosettable resin system of any of claims 1–5, comprising the steps of first fusing together at least a portion of the resin system components, including a portion of the total bismaleimide resin component, then adding the additional solid bismaleimide at a lower temperature.

21. A prepreg made from impregnating fibrous material with the thermosettable resin of claims 1–5.

22. An adhesive comprising the thermosettable resin of any of claims 1–5.

23. A resin transfer molding comprising the thermosettable resin of any of claims 1–5.

24. A resin film infusion comprising the thermosettable resin of any of claims 1–5.

25. A fiber reinforced composite part comprising the thermosettable resin of any of claims 1–5.

* * * * *